No. 49,312.  F. SKINNER.  PATENTED AUG. 8, 1865.
TIGHTENING PULLEYS BY FRICTION.

Witnesses:
Jas. P. Bristol
R. Fitzgerald

Inventor:
Franklin Skinner

UNITED STATES PATENT OFFICE.

FRANKLIN SKINNER, OF NEW HAVEN, CONNECTICUT.

IMPROVEMENT IN TIGHTENING PULLEYS BY FRICTION.

Specification forming part of Letters Patent No. 49,312, dated August 8, 1865.

*To all whom it may concern:*

Be it known that I, FRANKLIN SKINNER, of the city and county of New Haven, in the State of Connecticut, have invented a new and useful Improvement in Tightening Pulleys by Friction; and I do hereby declare that the following is a full, clear, and exact description of the construction, character, and operation of the same, reference being had to the accompanying drawings, which make part of this specification, in which—

Figure 1:
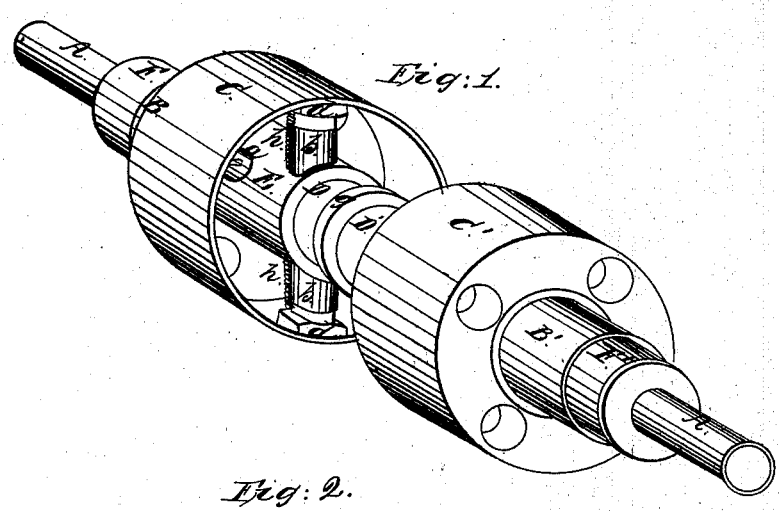
Figure 2:
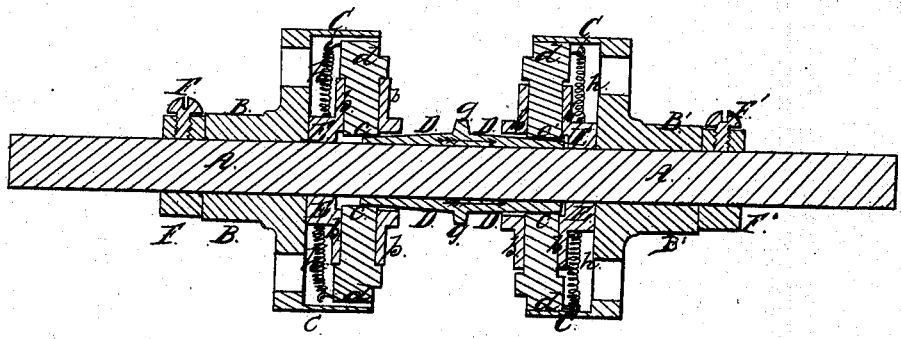
Figure 3:
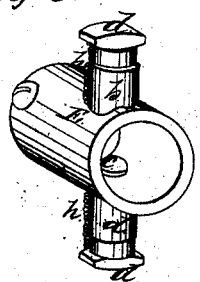
Figure 4:
Figure 5:
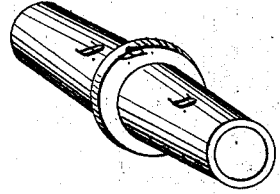

Figure 1 is a perspective view of a shaft with two pulleys arranged to work double for screw-cutting, &c., showing the adjustable collar, conical clutch-slide, and the friction-brakes. Fig. 2 is a section of the same cut longitudinally through the center, showing the relative positions of the several parts both when worked as tight pulleys or as loose. Fig. 3 is a perspective view of the adjustable collar E, Fig. 1, showing the outer ends of the brakes and the curved inclined plane on which the conical slide, Fig. 5, operates to tighten the pulley. Fig. 4 is a perspective view of one of the brakes with its arm or rod by which it is to be operated. Fig. 5 is a perspective view of the conical slide which the clutch-lever moves to tighten the brake.

My improvement consists in securing on a shaft or arbor one or two adjustable collars, each having two or more hollow arms at right angles to its axis, and in each of the arms or sleeves I insert a movable rod or plug, with its inner end curved and beveled to suit the convex surface of a conical slide or wedge, and on the outer end I have a friction-brake with a convex surface suited to impinge against the internal surface of the web of the pulley, and in using on the cylindrical shaft or arbor a hollow conical slide or wedge of such tapering shape that when the clutch-lever forces it into the adjustable collar the enlarged part will force the friction-brake outward, so as to brake or impinge upon the internal surface of the web of the pulley and bind it so tight that the shaft must revolve with the pulley, while at other times the pulley will revolve loose.

I make the arbor or shaft A A, Figs. 1 and 2, of steel or any other suitable material, of a true cylindrical form from end to end, so that the collars B B' of the pulleys C C', the conical slide or wedge D D', the adjustable collars E and E', and the binding-collars F and F' may all pass freely on it.

I make the adjustable collars E and E' of iron or any other suitable material, with two or more hollow arms or sleeves, $b$ and $b$, substantially as shown in Figs. 1 and 3 and indicated in section in Fig. 2. I make these arms or sleeves $b$ $b$ hollow, as indicated in section in Fig. 2, and insert into each a rod or plug made substantially of the shape or form shown in Fig. 4, with the inner end curved and inclined, as shown at $c$, Figs. 3 and 4, and indicated in section at $c$ and $c'$, Fig. 2, and with a convex-surfaced brake at the outer end, as shown at $d$, Figs. 1, 3, and 4, and indicated in section at $d$ and $d'$ in Fig. 2, and suited to drop into the hollow arms or sleeves $b$ and $b$, as shown in Figs. 1, 2, and 3, with a small projection or spline, as $e$, Fig. 4, to work in a groove to keep it from turning, and I attach spiral springs, as at $h$ $h$, Figs. 1, 2, and 3, to hold them toward the center, when they are not forced outward by the conical slide or wedge D D' for tightening the pulley.

I make the hollow conical slide or wedge D D' of iron or any other suitable material, substantially in the form and of the proportions shown in Fig. 5 and indicated in section in Fig. 2, when I use the pulleys double, as for cutting screws, &c., though either end D or D' will be sufficient in the common lathe, and on this conical slide D D', I have a projection like $g$, Figs. 1, 2, and 5, on which the clutch-lever operates to throw the desired pulley in gear.

I make the pulleys C and C' of cast-iron or any other suitable material, with a suitable collar, as shown at B', Fig. 1, and as indicated in section at B and B' in Fig. 2, fitted to turn freely on the arbor or shaft A A, and I make the other end large and open, as shown at C and C', Fig. 1, and indicated in section in Fig. 2, so that the adjustable collar E or E', with its appendages, may work within the space thus left open.

Having made the several parts as before described, I place the adjustable collar, with its appendages, as shown in Fig. 3, onto the arbor or shaft A A, and secure or adjust it in the desired place by the binding-screw $a$, Fig. 1, as at E or E', Fig. 2, and E, Fig. 1, when the springs *h* and *h* will force the rods or plugs, Fig. 4, inward to the position shown at *c*, Fig. 3, and at *c c*, Fig. 2, so that the ends *c* and *c'* may extend beyond the inner surface of the collar. I then slip on the conical slide or wedge, Fig. 5, as shown at D D', Fig. 1, so that one of the diminished ends will pass into the enlarged portion of the collar E, as indicated in section in Fig. 2; and when two pulleys are to be used I then put on the other adjustable collar, E', as indicated in section in Fig. 2, and secure or adjust it in its proper position by a binding-screw, like *a*, Fig. 1; and when the adjustable collars E and E' are properly secured, with the conical slide D D' in its place, I slip on the pulleys C and C' and secure them in their places by the two collars F and F', which I confine by ordinary binding-screws, as shown in Fig. 2, when the whole will appear as in Fig. 1, and will be ready for use as the double pulley for screw-cutting, &c.

When I wish to tighten one of the pulleys, as C', by means of a suitable clutch-lever acting on the projection *g*, I force the conical slide or wedge D D' in the direction indicated by the darts in Fig. 2, when the inclined or wedge end will act upon the inclines at *c' c'* and force the rods or plugs, as Fig. 4, outward, so that the convex faces of the brakes will impinge on the internal surface of the pulley C', as shown at *d'* and *d'*, when the shaft will be carried round with the pulley to produce the operation desired, while the other pulley, C, will run entirely loose, because the end D of the conical slide will be drawn back so as not to press against the inner ends, *c* and *c*, of the rods or plugs, Fig. 4, but will allow the springs *h* and *h* to force those plugs inward, so that the brakes will not touch the internal surface of the pulley C, as shown at *d* and *d*, all as represented in section in Fig. 2. This slide D D' may be reversed in its position as often as desired or as the work being done may require, and when desired it may be placed midway, when both of the pulleys will run loose.

When but one pulley is needed, as in a lathe for ordinary purposes, but one adjustable collar with its appurtenances is necessary, and the pulley can be run as fast or loose at pleasure.

The advantages of my improvement consist in the simplicity of its construction, in its freedom from liability to get out of repair, in the ease and readiness with which the pulleys are thrown in and out of gear, and in that it so effectually obviates the unpleasant noise of the common clutch and prevents the great strain which is inseparable from the unyielding character of the common clutch.

What I claim as my invention, and desire to secure by Letters Patent, is—

The combination of the adjustable collar and its appendages, Fig. 3, with the conical slide, Fig. 5, and pulleys C C', when they are constructed substantially as herein described, and are fitted for use (either double or single) on a proper arbor or shaft, as herein set forth.

FRANKLIN SKINNER.

Witnesses:
 JAS. P. BRISTOL,
 R. FITZGERALD.